Patented Nov. 15, 1938

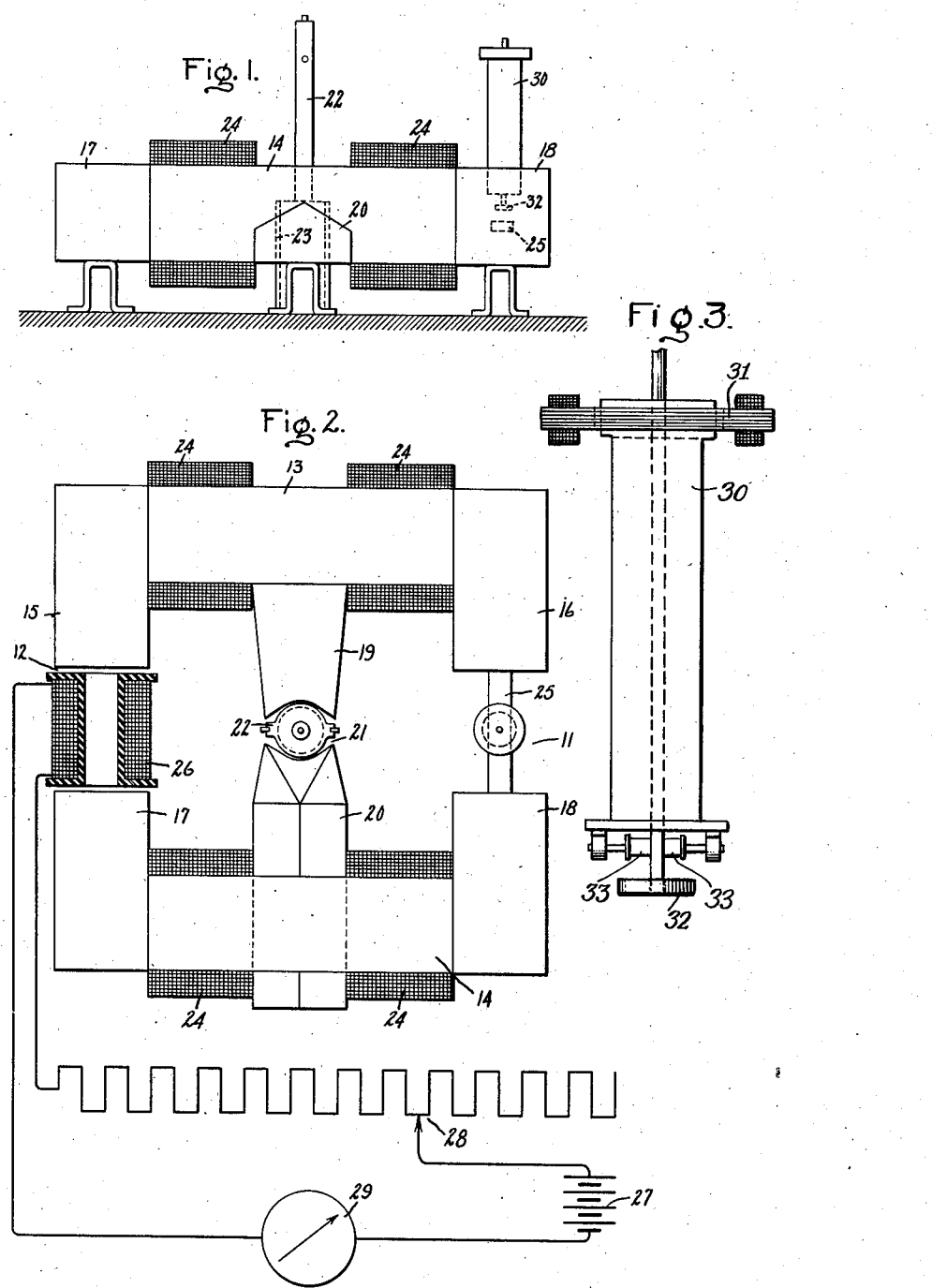

2,137,177

UNITED STATES PATENT OFFICE 2,137,177

MAGNETIC TESTER

Paul Melchior, Berlin-Halensee, Germany, assignor to General Electric Company, a corporation of New York Application November 20, 1936, Serial No. 111,909
In Germany November 21, 1935

4 Claims. (Cl. 175—183)

My invention relates to magnetic testing devices and methods and concerns particularly an arrangement for compensating for the effect on a testing device of magnetization of a test piece.

It is an object of my invention to provide a testing device and method for testing the magnetic properties of magnetic materials with increased speed and accuracy.

It is an object of my invention to provide a testing arrangement which is particularly useful in the testing of permanent magnet materials and is generally useful for measuring magnetic characteristics, such as remanence, coercive force, etc., or for obtaining a continuous portion of the magnetization curve or curve of magnetic induction in relation to magnetic field strength.

Other and further objects and advantages will become apparent as the description proceeds.

In carrying out my invention in its preferred form, I provide a magnetic test yoke or core in the form of a hollow square or loop, closed except for a pair of air gaps on either side. One of said air gaps is for receiving a magnetic test specimen. A magnetic bridging member is placed along the center of the core and exciting windings are placed on the core symmetrically with respect to the bridging member so that any flux originating from the test piece finds its return path through the bridging member. Accordingly, a flux detector placed in the bridging member serves to measure the useful flux through the test piece as the stray flux is shunted out through the second air gap. In order to compensate for magnetization of the test piece and make the test by a pure bridge method, a compensating coil is placed in the second air gap of the core and sufficient current is passed therethrough to balance the flux in the device and bring the indication of the flux detector to zero. The ampere turns of the compensating coil then represent the magnetization of the test piece, which may accordingly be calculated from the ampere turns of the compensating coil.

The invention may be understood more readily from the following detailed description taken in connection with the accompanying drawing and those features of the invention which are believed to be novel and patentable will be pointed out in the claims appended hereto. In the drawings, Fig. 1 is a front elevation of one embodiment of my invention; Fig. 2 is a plan view of the same embodiment with a circuit diagram of the electrical connections; and Fig. 3 is a detailed view of an arrangement for measuring field strength in connection with the apparatus of Figs. 1 and 2. Like reference characters are utilized throughout the drawings to designate like parts.

In the form of the invention illustrated in the drawings, there is a magnetic core in the form of a hollow square or a loop with air gaps at 11 and 12. The core is made up of parallel pieces 13 and 14, carrying pairs of pole pieces 15 and 16 and 17 and 18, respectively. The pole pieces 16 and 18 extend toward each other to form the air gap 11 and the pole pieces 15 and 17 extend toward each other to form the air gap 12. A bridging member consisting of the magnetic pieces 19 and 20 is provided for magnetically joining the midportions of the core portions 13 and 14. An air gap 21 is left between the pieces 19 and 20 and a suitable magnetic detector 22 is mounted within the air gap 21. The magnetic detector 22 may take the form of a rotatably suspended coil 23 through which a current of definite value is passed by a current source, not shown. Preferably the coil 23 has a soft iron core to minimize reluctance of the gap. Exciting windings 24 are mounted on the pieces 13 and 14 in such a manner as to be symmetrical with respect to the midportions thereof and, accordingly, symmetrical with respect to the bridging members 19 and 20. The exciting windings 24 are connected to a suitable current source, not shown, and the connections are such that flux is caused to flow around the core in a continuous circuit. For example, through piece 14, across gap 12, through piece 13, across gap 11 and back to the piece 14, or vice versa.

A specimen to be tested, such as the bar 25, is placed in the air gap 11, preferably with the faces of the pole pieces 16 and 18 against the ends of the specimen 25. In order to make the apparatus adjustable for test specimens of various sizes and shapes, part of the core may be made movable so as to permit varying the length of the gaps 11 and 12. One of the core pieces, for example, the core piece 14 carrying the parts 17, 18 and 24 is made slidable on the piece 20 and, to this end, the piece 14 may be notched and the piece 20 may be shaped to fit.

In the absence of any test piece in the gap 11, the flux distribution in the apparatus will be symmetrical so that the flux densities in the gaps 11 and 12 will be equal and no flux will cross the air gap 21. However, when the test piece 25 is placed in the gap 11, the reluctance of one-half the magnetic circuit is reduced, causing greater flux to cross the air gap 11. The return path for this additional flux is provided by the bridging pieces 19 and 20 and the flux crossing the gap 21, measured by the flux detector 22, serves as a measure of the magnetization of the test piece 25, the portion of the magnetic circuit including the gap 12 serving to shunt out the leakage flux.

In order to carry out the measurement by the pure bridge method or the null method in which the indication of the flux detector 22 would be brought to zero while making the measurement, I provide a compensating coil 26 in the air gap 12. A suitable source of current 27 is connected to the compensating coil 26 in series with a rheostat 28 for controlling the current and a current-responsive device, such as an ammeter 29, for measuring the current. In making a determination by the bridge method, the rheostat 28 is adjusted so that the indication of the flux detector 22 falls to zero so as to make the measurement independent of the calibration of the flux detector. The magnetomotive force of the coil 26 producing a null deflection of the indicator 22 represents the magnetization of the test specimen 25, which may, accordingly, be calculated from the number of turns of the coil 26 and the current flowing through it, measured by the ammeter 29.

Any suitable means may be employed for measuring the field strength acting on the test specimen 25, such as calculation from the dimensions of the testing device or the use of a rotary field indicator, such as the field indicator 30 shown more in detail in Fig. 3. The indicator 30 consists of a constant-speed motor 31 driving a coil 32 adapted to be placed in close proximity to the surface of the test specimen 25. The coil 32 may be provided with a commutator cooperating with suitable brushes 33 and a millivoltmeter, not shown, may be connected to the brushes 33 for measuring the induced voltage and determining the field intensity in the manner well known to those skilled in the art.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A device for testing specimens of magnetic material comprising in combination, a symmetrical magnetic core in the form of a loop with similar air gaps on either side thereof, one of said air gaps being adapted to receive a specimen to be tested, an auxiliary current conducting winding in the other of said air gaps having its magnetic axis parallel with lines crossing said air gap, an exciting winding symmetrically arranged on said core, means for passing an adjustable current through said auxiliary winding, and means responsive to the magnitude of said current, said core having a bridge member across the center thereof with an air gap therein and a flux detector in said latter air gap.

2. A device for testing specimens of magnetic material comprising in combination, a pair of electromagnets with magnetic axes substantially parallel, each with a pair of pole pieces extending toward corresponding pole pieces of the other magnet, spaced to leave air gaps between confronting pole pieces, one of said air gaps serving to receive a specimen to be tested, a compensating winding in the other of said air gaps with its magnetic axis along a line joining confronting pole pieces, a bridging member of magnetic material joining midportions of said electromagnets and having an air gap therein, a flux detector in said air gap, and means for passing an adjustable measureable current through said compensating winding to compensate for magnetization of a test specimen placed within the first of the air gaps of said testing device.

3. A method of determining magnetization of a test specimen which comprises placing the specimen in a magnetic field, previously symmetrical and thereby rendering it unsymmetrical, applying sufficient magnetomotive force to restore symmetry to the magnetic field by compensating for the magnetization of the specimen, and determining the strength of the magnetomotive force applied.

4. A device for testing specimens of magnetic material comprising in combination, a magnetic core providing a continuous magnetic circuit having a pair of air gaps therein, in one of which a specimen to be tested is received, a magnetic bridging member joining opposite sides of said core, a flux detector included in said bridging member, an exciting winding on said core arranged to produce equal fluxes across said air gaps in the absence of a test specimen, and a compensating winding in the second of said air gaps for balancing the effect of magnetization of a specimen in the first of said air gaps.

PAUL MELCHIOR.